United States Patent [19]

Kempter et al.

[11] 4,444,634

[45] * Apr. 24, 1984

[54] POLYADDUCT/POLYCONDENSATE WHICH CONTAINS BASIC NITROGEN GROUPS, AND ITS USE AS ELECTRODEPOSITABLE COATING

[75] Inventors: Fritz E. Kempter, Mannheim; Eberhard Schupp, Schwetzingen, both of Fed. Rep. of Germany

[73] Assignee: BASF Aktiengesellschaft, Fed. Rep. of Germany

[*] Notice: The portion of the term of this patent subsequent to Jul. 20, 1999 has been disclaimed.

[21] Appl. No.: 388,517

[22] Filed: Jun. 15, 1982

[30] Foreign Application Priority Data

Jun. 19, 1981 [DE] Fed. Rep. of Germany ....... 3123968

[51] Int. Cl.³ .................. C25D 13/06; C25D 13/07
[52] U.S. Cl. .................. 204/181 C; 523/414; 525/504; 528/99; 528/100; 528/107
[58] Field of Search .............. 525/504; 528/99, 100, 528/107; 204/181 C

[56] References Cited

U.S. PATENT DOCUMENTS

| | | | |
|---|---|---|---|
| 2,989,534 | 6/1961 | Cislak | 260/294.9 |
| 3,839,252 | 10/1974 | Bosso et al. | 523/416 |
| 3,984,299 | 10/1976 | Jerabek | 204/181 |
| 3,994,989 | 11/1976 | Kempter et al. | 525/490 |
| 4,001,155 | 1/1977 | Kempter et al. | 523/416 |
| 4,036,795 | 7/1977 | Tominaga | 523/415 |
| 4,189,450 | 2/1980 | Kempter et al. | 525/455 |
| 4,210,506 | 7/1980 | Hoppe et al. | 204/181 C |
| 4,269,742 | 5/1981 | Goeke et al. | 528/99 X |
| 4,336,116 | 6/1982 | Schupp et al. | 528/99 X |
| 4,340,455 | 7/1982 | Kempter et al. | 528/99 X |
| 4,340,714 | 7/1982 | Kempter et al. | 528/99 X |

*Primary Examiner*—Earl A. Nielsen
*Attorney, Agent, or Firm*—Keil & Witherspoon

[57] ABSTRACT

Polyadducts/polycondensates which can be diluted with water when protonated with an acid and which contain basic nitrogen groups are obtained by the polyaddition reaction of (A) a Mannich base obtained from
(a) a monophenol and/or a polyphenol,
(b) one or more dialkylamines of the formula

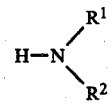

where $R^1$ and $R^2$ are each alkyl or alkoxyalkyl, or are linked to one another to form a 5-membered or 6-membered ring, and
(c) formaldehyde with
(B) an epoxy resin and contain groups, which are bonded to aromatic rings, of the general formula

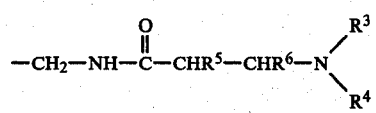

and may or may not contain groups of the general formula

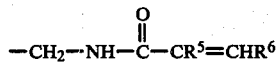

where $R^3$ and $R^4$ are each alkyl, hydroxyalkyl or alkoxyalkyl, or are linked to one another to form a 5-membered or 6-membered ring, and $R^5$ and $R^6$ are each hydrogen or methyl.

These products are useful as binders for the cathodic electrocoating of metallic articles.

9 Claims, No Drawings

POLYADDUCT/POLYCONDENSATE WHICH CONTAINS BASIC NITROGEN GROUPS, AND ITS USE AS ELECTRODEPOSITABLE COATING

The present invention relates to polyadducts/polycondensates which can be diluted with water when protonated with an acid, contain basic nitrogen groups, and are obtained from a Mannich base and an epoxy resin, and to their use for cathodic electrocoating.

German Pat. No. 2,357,075, German Published Application DAS No. 2,419,179 and German Laid Open Application DOS No. 2,755,906 disclose surface coating binders which are obtained by the polyaddition reaction of a Mannich base with an epoxy resin, the Mannich bases used being condensates of a condensed phenol containing two or more phenolic hydroxyl groups per molecule, a secondary amine containing a hydroxyalkyl group, and formaldehyde.

The binders described in the above publications give excellent coatings when applied cataphoretically onto metal components from surface coating baths having a high pH (above 7.0) but possess certain weaknesses in respect of their shelf life and bath stability.

It is an object of the present invention to provide polyadducts/polycondensates which contain basic nitrogen groups and exhibit the above disadvantages to a substantially reduced extent, if at all.

We have found that this object is achieved, surprisingly, when a dialkylamine of the formula

(b)

where $R^1$ and $R^2$ are identical or different and are each alkyl or alkoxy of 1 to 9 carbon atoms, or are linked to one another to form a 5-membered or 6-membered ring, is used for the synthesis of component (A), and, at least in part, a mononuclear or polynuclear monophenol and/or polyphenol which contains groups of the general formula (I)

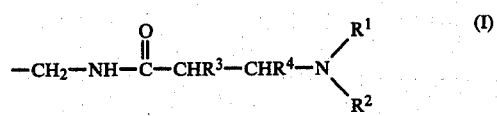
(I)

and may or may not contain groups of the formula (II)

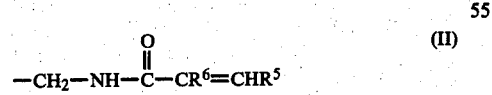
(II)

is used as component (A).

The present invention relates to polyadducts/polycondensates which can be diluted with water when protonated with an acid, contain basic nitrogen groups, and are obtained by the polyaddition reaction of (A) from 5 to 90% by weight of a Mannich base obtained from
  (a) a monophenol and/or a polyphenol,
  (b) one or more dialkylamines of the formula

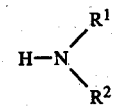

where $R^1$ and $R^2$ are identical or different and are each alkyl or alkoxyalkyl of 1 to 9 carbon atoms, or are linked to one another to form a 5-membered or 6-membered ring, and
  (c) formaldehyde or a formaldehyde donor, with
(B) from 10 to 95% by weight of one or more epoxy resins, wherein the polyadduct/polycondensate of (A) with (B) contains groups, which are bonded to aromatic rings, of the general formula (I)

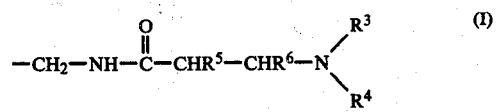
(I)

and may or may not contain groups of the general formula (II)

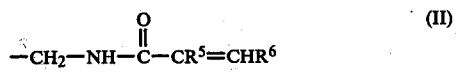
(II)

where $R^3$ and $R^4$ are identical or different and are each alkyl of 1 to 9 carbon atoms, or hydroxyalkyl or alkoxyalkyl, each of 2 to 10 carbon atoms, or are linked to one another to form a 5-membered or 6-membered ring, and $R^5$ and $R^6$ are identical or different and are each hydrogen or methyl.

Preferably, the monophenols and/or polyphenols used to prepare the Mannich base (A) comprise
  (a₁) one or more mononuclear or polynuclear monophenols and/or polyphnols, some or all of which are replaced by
  (a₂) a mononuclear or polynuclear monophenol and/or polyphenol which contains groups of the general formula (I)

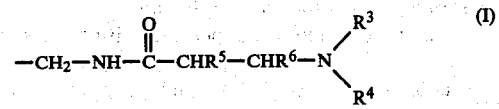
(I)

and may or may not contain groups of the general formula (II)

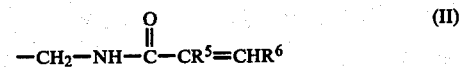
(II)

where $R^3$, $R^4$, $R^5$ and $R^6$ have the above meanings, and which has been obtained by the Tscherniac-Einhorn reaction of an acrylamide.

Preferably, also, di-n-butylamine (b) or a mixture of di-n-butylamine and another secondary amine is used as component (b), and a reaction product of a mononuclear or polynuclear monophenol and/or polyphenol with N-methylolacrylamide or N-methylolmethacrylamide (where an addition reaction of diethanolamine as the secondary amine at the carbon-carbon double bond of the acrylamide or methacrylamide takes place) is used.

The present invention also relates to the use of these polyadducts/polycondensates for the cathodic electrocoating of metallic articles.

Compared with the lacquer binders disclosed in the above German Patent, German Published Application and German Laid-Open Application and in German Laid-Open Application DOS No. 2,755,906, the polyadducts/polycondensates according to the invention are particularly advantageous because the di-hydroxyalkylamine or alkylhydroxyalkylamine, eg. diethanolamine, usually required for building up the Mannich group

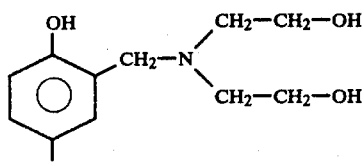

necessary for crosslinking is not needed. Surprisingly, we have found that, to ensure adequate crosslinking, it is only necessary to incorporate groups of the general formula (I)

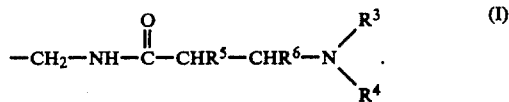

This is particularly remarkable, since the reaction products of components (A) and (B) are polyadducts/polycondensates which have phenolic end groups,

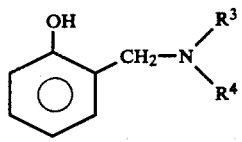

which should inhibit crosslinking of the groups of the general formula (II), into which groups of the general formula (I) are split during baking.

It may be stated in connection with the introduction of the groups of the general formula (I) that it is advantageous to carry out a Michael addition reaction with secondary amines at the C—C double bonds of the group (II)

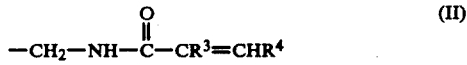

before the Mannich reaction, these C—C double bonds being at least partly reacted, but preferably completely reacted, when only a relatively small number of them are present and are to be used to achieve adequate water-solubility.

It is possible, for example, to follow the Tscherniac-Einhorn reaction of acrylamide or methacrylamide with a partial reaction of the double bonds by the Michael addition reaction and then to react the phenolic groups of the resulting reaction product with an excess of polyepoxide, after which the epoxide groups remaining in the product thus obtained are reacted with the Mannich base ($a_1$).

It is also possible to use the above route to prepare products of (A) and (B) which contain groups of the general formula (II)

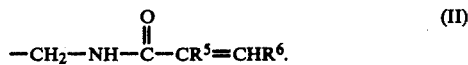

The following details may be noted concerning the components which make up the polyadducts/polycondensates according to the invention:

(A) Preparation of the Mannich base (a) Suitable mononuclear or polynuclear monophenols or polyphenols ($a_1$) are phenol, its monoalkyl and dialkyl derivatives, where alkyl is of 1 to 18 carbon atoms, eg. o-cresol, p-cresol and p-tert.-butylphenol, naphthols, eg. α-naphthol and β-naphthol, ®Cardanol, and in particular polyhydric phenols containing one or more aromatic radicals, preferably bis-phenol A or novolacs, indane derivatives, as described in U.S. Pat. No. 2,989,534, which contain phenol groups

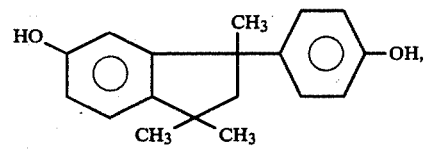

cumarone and indene resins which quite generally contain phenol groups, butadiene and isoprene homopolymers or copolymers which contain phenol groups, for example as described in German Laid-Open Application DOS No. 2,755,906, products containing polybutadiene imide groups as described in German Patent Application P No. 32 26 873.6 and polyphenols containing ether groups, as described in German Published Application DAS No. 2,419,179.

Particularly suitable components (a) are phenols of the general formula

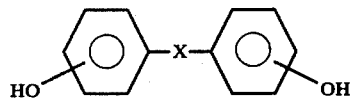

where the OH groups are in the ortho and/or para position to X, and X is a straight-chain or branched divalent aliphatic radical of 1 to 3 carbon atoms, or is >SO$_2$, >SO, —S—, >C=O or —O—; a preferred compound is bisphenol A. The alkyl derivatives of these polynuclear phenols may also be used.

A Mannich condensate obtained from one or more phenols and/or alkylphenols, a primary amine and formaldehyde or a formaldehyde donor, as described in German Laid-Open Application DOS No. 2,711,385, is also suitable as component (A) for the preparation of the novel surface coating binder.

Suitable phenols for the preparation of these Mannich condensates are phenol or alkylphenols, preferably monoalkylphenols, where alkyl is straight-chain branched or cyclic and of 1 to 18, in particular 3 to 12, carbon atoms, eg. hexylphenol, nonylphenol, dodecylphenol and tert.-butylphenol. Nonylphenol (also including, for example, technical-grade nonylphenol containing 85% of 4-nonylphenol), and p-tert.-butylphenol, and mixtures of these alkylphenols with phenol are preferred.

3-alkylphenols, for example ®Cardanol, which can be obtained from cashew nut shell oil and which is stated to consists essentially of 3-(pentadeca-8,11-dienyl)-phenol, are also suitable. Some of the unsubstituted phenol may also be replaced by bisphenol A. Suitable primary amines are monoalkylamines where alkyl is straight-chain, branched or cyclic and of 2 to 13, preferably 2 to 6, carbon atoms, eg. butylamine, hexylamine or octylamine, and hydroxyl-substituted and alkoxy-substituted monoalkylamines, such as monoethanolamine, monoisopropanolamine and 2-alkoxyethylamines, eg. 2-methoxyethylamine and 2-ethoxyethylamine, and mixtures of these amines.

To prepare these Mannich condensates, usable as component (A), the phenol or alkylphenol, primary amine and formaldehyde or formaldehyde donor are advantageously reacted in amounts which provide not less than 1 mole of the primary amine and not less than 2 moles of formaldehyde per 2 moles of phenol or alkylphenol.

Component ($a_2$) is a mononuclear or polynuclear monophenol and/or polyphenol which contains groups of the general formula (I)

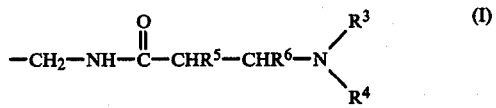

and may or may not contain groups of the general formula (II)

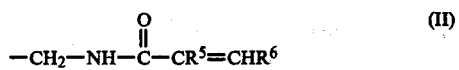

where $R^3$ and $R^4$ are identical or different and are each alkyl of 1 to 9 carbon atoms, or hydroxyalkyl or alkoxyalkyl, each of 2 to 10 carbon atoms (but preferably hydroxyethyl), or are linked to one another to form a 5-membered or 6-membered ring, and $R^5$ and $R^6$ are identical or different and are each hydrogen or methyl. Groups of the general formula I are generally introduced by the acid-catalyzed Tscherniac-Einhorn reaction of a phenol with an N-methylolamide of acrylic or methacrylic acid, the reaction being carried out in general at from 30° to 150° C., preferably from 50° to 120° C.

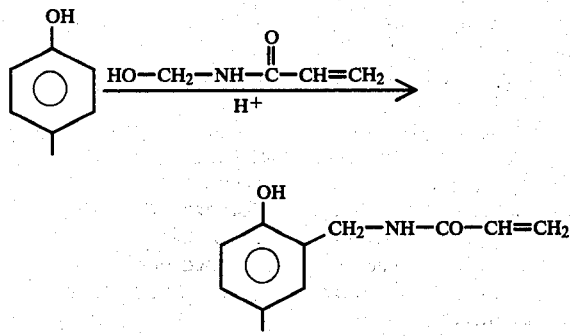

Tscherniac-Einhorn reaction

The subsequent Michael addition is carried out at from 70° to 120° C., preferably from 80° to 100° C.

The statements made in relation to component (b) apply to the amine moiety of the groups of the general formula (I). However, preferred amines are secondary alkanolamines, eg. alkylalkanolamines, diisopropanolamine and the like, and hydroxyalkylpiperazines, eg. hydroxyethylpiperazine, but especially diethanolamine.

Amines having a secondary and a tertiary amino group, for example those of the piperazine class, such as N-hydroxyethylpiperazine, or, for example, N,N,N'-trimethylalkylenediamines, are particularly preferred. The advantage of these amines, besides their low volatility, is that two amino groups are incorporated per reaction step and that, for example, compared with diethanolamine, which also has a low volatility, the N atoms incorporated are substantially more basic and thus, in addition to a higher pH of the baths, an improved catalytic effect on the reaction of component (A) with component (B) or a reduction in the reaction temperature and/or a more specific reaction path in respect of the reaction of the phenolic groups with the epoxide groups is ensured. The same is also true if quaternary amino groups are present in the reaction mixture.

The combination of group (I) with the dialkylaminomethylphenol group provides crosslinking possibilities other than the conventional ones for Mannich bases disclosed in the above German Laid-Open Application, German Published Application and German Patent, which leads to particularly advantageous leveling and hardening characteristics of the coatings.

(b) The secondary amines (b) employed are those of the general formula

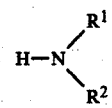

where $R^1$ and $R^2$ are identical or different and are each a straight-chain or branched aliphatic radical of 1 to 9, preferably 3 to 8, carbon atoms, or alkoxyalkyl of 2 to 10 carbon atoms, or $R^1$ and $R^2$ are linked to one another to form a 5-membered or 6-membered ring. Examples of especially suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, eg. di-2-methoxy-, di-2-ethoxy- and di-2-butoxyethylamine.

These secondary amines mainly influence the stability characteristics of the binder, but they also affect the leveling and inner plasticization of the surface coatings produced with the binders.

(c) The formaldehyde or formaldehyde donor is preferably used in the form of a solution of formaldehyde or paraformaldehyde, or a mixture thereof, in an alcohol, for example in butanol.

The Mannich bases (A) are prepared in accordance with the conventional methods described in the literature, for example in Houben-Weyl, Methoden der organischen Chemie, Volume XI/1, page 731, 1957. The solvent is chosen in accordance with the different polarity conditions. It may be advantageous to use higher alcohols, cycloaliphatics or alkylaromatics together with polar solvents.

The starting materials are employed in ratios which depend on the particular properties which the end product is to have; the weight ratio of component ($a_1$) to component ($a_2$) is from 1:0.1 to 1:15, preferably from 1:0.5 to 1:10.

The ratio of the starting materials (a₁), (a₂) and (b) for the preparation of component (A) is advantageously such as to provide from about 0.1 to 2.0, prepferably from 0.3 to 1.5, molecules of component (b) per phenolic hydroxyl group of the mixture of components (a₁) and (a₂).

Not less than 1 mole of (c) is used per mole of (b) in the preparation of the Mannich bases (A).

In a particularly preferred embodiment of the present invention, the preparation of the Mannich base is carried out with a formaldehyde donor, for example paraformaldehyde, in an amount which is virtually equivalent to the amine component used and is in general not more than 25% in excess thereof, in an alcohol, such as isopropanol or isobutanol, and component (A) is reacted directly, ie. without any subsequent reaction with further formaldehyde, with component (B).

In general, the reaction of component (A) with component (B) is controlled so that the novel polyadducts/polycondensates formed have mean molecular weights from 800 to 5,000, preferably from 1,000 to 3,000, and some or all of the terminal groups of the main chain are in the form of terminal phenolic groups, ie. dialkylaminomethylphenol groups.

The reaction of component (A) with component (B) is carried out in general at from 20° to 100° C., preferably from 60° to 90° C., particularly preferably from 70° to 80° C., in an organic solvent, for example an alcohol of 3 to 15 carbon atoms, a glycol ether, an alkylaromatic, eg. toluene, etc., or a cycloaliphatic.

To prepare the novel electrocoating binders, from 5 to 90% by weight, preferably from 15 to 60% by weight, of the Mannich condensate (A) is reacted with from 10 to 95% by weight, preferably from 30 to 85% by weight, of epoxy resin (B), and component (a₂) may be present during the preparation of component (A) or may be added only after the preparation of component (A). The degree of etherification of the phenolic components (a₁) and (a₂) with the epoxy resin (B) can be used to vary, in particular, the stability, and also other important properties, for example the electrical breakdown strength.

If the reaction is carried out in the presence of a small amount of a tertiary amine which can be quaternized, ie. one which contains one or more methyl groups, the product obtained contains a quaternary ammonium group, and this may be desirable for increasing the pH of the electrocoating bath produced.

(B) Suitable epoxy resins (B) are the conventional polyepoxide compounds, preferably those having 2 or 3 epoxide groups in the molecule, for example reaction products of polyhydric phenols, especially those of the formula mentioned under (a₁), namely

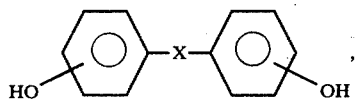

with epichlorohydrin, but also the above reaction products of polyhydric alcohols, for example pentaerythritol, trimethylolpropane or glycerol, with epichlorohydrin.

Suitable products can be derived from any diol or polyol, which may or may not contain ether groups, and after introduction of the glycidyl radical the product may still contain some free alcoholic OH groups or be entirely devoid of such groups. Reaction products, still containing epoxide groups, of epoxy resins with primary or secondary amines or with hydroxyl-containing glycol ethers may also be used, as may epoxy resins which contain hetero-atoms, such as sulfur. Epoxy resins containing blocked urethane groups, as described in German Laid-Open Applications DOS No. 2,554,080 and DOS No. 2,541,801, are also suitable. Quite generally, all resins which contain 1,2-epoxide groups and are derived from polyacrylate, polyether, polyester or polyurethane resins, or from polybutadiene oils or other oils, and products which contain epoxidized cyclohexene radicals, may also be used.

Other suitable compounds derived from resins and containing epoxide groups are nitrogen-containing diepoxides, as described in U.S. Pat. No. 3,365,471, epoxy resins derived from 1,1-methylene-bis-(5-substituted hydantoin), as described in U.S. Pat. No. 3,391,097, diepoxides of bis-imides as described in U.S. Pat. No. 3,450,711, epoxidized aminomethyl-diphenyl oxides as described in U.S. Pat. No. 3,312,664, aliphatic and heterocyclic N,N'-diglycidyl compounds, for example as described in U.S. Pat. No. 3,503,979, aminoepoxyphosphonates as described in British Pat. No. 1,172,916, 1,3,5-triglycidyl isocyanurates and further materials, containing epoxide groups, known in the art.

In order to achieve the higher functionality of component (B) which is preferred for resin formation from components (A) and (B), component (B) can, if desired, be reacted with a diisocyanate, eg. hexamethylene diisocyanate or toluylene diisocyanate, or with a polyisocyanate. For example, epoxide compounds which in addition to an epoxide group contain other functional groups, for example OH groups, can be reacted with diisocyanates. Where appropriate, the epoxy resins can be reacted further with partially blocked diisocyanates and polyisocyanates.

The novel polyadduct/polycondensate is prepared from components (A) and (B) preferably using amounts such as to provide from 0.1 to 0.9, particularly from 0.3 to 0.7, epoxide group per phenol molecule; it is substantially free from epoxide groups and should, at the use stage, not contain more than 0.25 epoxide group per molecule of the product. Any epoxide groups still present after the preparation of the binders, ie. for example when a particular viscosity is reached, can, where necessary, be removed by the addition of a mercaptan, an acid or an amine.

The novel polyadduct/polycondensate (solid resin) contains in general from 0.5 to 25, preferably from 2.5 to 15, % by weight of the group (I), of which not more than 60% (based on (meth)acrylamide) may be in the form of the group (II).

Suitable additives to the novel polyadducts/polycondensates include polybutadiene oils and other hydrocarbon oils, as well as compounds containing blocked urethane groups, as described, for example, in German Laid-Open Applications DOS No. 2,711,425 and DOS No. 2,755,907. The binders described in German Laid-Open Application DOS No. 2,606,831 may also be used as additives.

The polyadducts/polycondensates according to the invention can be diluted with the conventional surface-coating solvents, such as alcohols of 4 to 16 carbon atoms, eg. isopropanol, decanol, n-butanol and isobutanol, alkylaromatics, eg. toluene, and cycloaliphatics, or with aqueous organic solvents or solvent mixtures, and are applied, with or without admixture of pigments, fillers and conventional assistants, to the substrate to be coated, for example to wood, metal, glass or ceramic, by conventional surface coating methods, such as spraying, dipping or flooding; the coating is then dried, and hardened at above 170° C. The coatings thus obtained possess, for example, great hardness and resistance to solvents.

Preferably, however, the novel surface coating binders are employed protonated with acids, for example phosphoric acid or its derivatives or, preferably, water-soluble carboxylic acids, eg. acetic acid, formic acid or lactic acid. The protonated surface coating binder can be diluted with water and can be applied using the conventional coating methods mentioned above, again giving coatings having very useful properties. However, the degree of protonation should be kept as low as possible.

The preferred use of the protonated surface coating binders according to the invention is the cathodic electrocoating of electrically conductive substrates, for example metal articles, sheets and the like made of brass, copper, aluminum, iron or steel, which may or may not be chemically pretreated, for example phosphatized.

The aqueous solutions or dispersions of the novel surface coating binders, some or all of which are in the form of a salt of a water-soluble carboxylic acid, also contain, as a mixture with these binders, assistants which can be cataphoretically deposited, such as soluble dyes, solvents, flow improvers, stabilizers, hardening catalysts, especially metal-containing manganese or cobalt naphthenates or octoates which accelerate hardening, and also metal salts of the prior art, as disclosed in, for example, German Laid-Open Applications DOS No. 2,541,234 and DOS No. 2,457,457, but in particular the Cu++ ion, which is capable of complex formation with the novel binder, antifoams and other additives and assistants.

The novel surface coating binders can be used both as the principal base resin for electrocoating and as the base resin in the pigment paste. Alternatively, the resin can be used as the principal base resin for the electrocoating composition, in combination with a conventional pigment paste, or can be used as the base resin in a pigment paste, in combination with a conventional polyamine-containing base resin for the cathodic electrocoating process. The amine-containing cationic electrocoating resins are known and do not require detailed description here. Examples of suitable resins include resins containing tertiary amine salts, as disclosed in German Laid-Open Application DOS No. 2,603,666, and resins containing quaternary ammonium groups, as described in U.S. Pat. No. 3,839,252.

For cathodic electrocoating, the solids content of the electrocoating bath is in general brought to 5-20% by weight by dilution with demineralized water. The deposition is in general carried out at from 15° to 40° C. for a period of from 1 to 2 minutes at a bath pH of from 5.0 to 8.5, preferably from 6.0 to 7.5, at a deposition voltage of from 50 to 500 volt. After the film which has been cathodically deposited on the electrically conductive article has been rinsed, the self-crosslinking binder is hardened for not more than 30 minutes at about 150°–220° C., preferably for 20 minutes at 160°–200° C., The novel polyadducts/polycondensates, when used for cathodic electrocoating, give coatings having excellent properties, such as great hardness and scratch resistance, coupled with resilience and firm adhesion to the substrate. Moreover, the good throwing power of the binders is striking.

Furthermore, the coatings obtained have good solvent resistance and resistance to the salt spray test.

In the Examples, parts and percentages are by weight.

EXAMPLES (a) Preparation of a polyphenol containing ether groups 420 parts of a triglycidyl ether obtained from pentaerythritol and epichlorohydrin, and having an epoxide value of 0.62, are reacted with 73.2 parts of phenol for 30 minutes at 180° C. as described in Example 1 of German Pat. No. 2,419,179. 364.6 parts of bisphenol A are then added, the temperature of the mixture dropping to about 120° C. The mixture is heated again to 180° C. in the course of 30 minutes and is kept at this temperature for 1 hour, cooled to 130° C. and diluted with 420 parts of toluene to give a solids content of 67.8%.

(b) Preparation of a polybutadienemaleimide 2,100 parts of a polybutadiene oil (eg. Lithene PM4 from Metallgesellschaft AG), 300 parts of maleic anhydride, 24 parts of methyl isobutyl ketone and 2.4 parts of phosphorous acid are reacted for 4 hours at 190° C. 78 parts of ammonia gas are then passed in at from 135° to 140° C. and the mixture is stirred for a further 3 hours at 190° C., during which water is eliminated. The mixture is then diluted to a solids content of 76.4% with 612 parts of toluene.

(c) Preparation of a butadienemaleimide 1,800 parts of the polybutadiene oil described under (b), 200 parts of maleic anhydride, 20 parts of methyl isobutyl ketone and 2 parts of phosphorous acid are reacted for 4 hours at 190° C. 52 parts of ammonia gas are then passed in at from 135° to 140° C. and the mixture is stirred for a further 3 hours at 190° C., during which water is eliminated. The mixture is then diluted to a solids content of 77.4% with 510 parts of toluene.

(d) Tscherniac-Einhorn/Michael reaction 430 parts of the polyphenol which contains ether groups and has been prepared according to (a), 136.5 parts of acrylamide, 79.7 parts of paraformaldehyde, 91 parts of p-tert.-butylphenol, 0.4 part of phenothiazine and 78 parts of bisphenol A are brought into solution at 115° C. The solution is then cooled to 60° C. and 1 part of boron trifluoride ethyl etherate is added. After reaction for 30 minutes at 60° C., a further 1 part of boron trifluoride ethyl etherate is added, followed by another 0.7 part after another 30 minutes at 60° C. The mixture is stirred for 3 hours at 60° C., and water is then eliminated at 120° C. Thereafter, 202 parts of diethanolamine are added, and the mixture is allowed to continue reacting for a further 2 hours at 90° C., and is then diluted with 29.4 parts of isobutanol, 29.4 parts of isopropanol, 110 parts of butylglycol and 110 parts of ethylglycol. The solids content is 67.3%.

(e) Tscherniac-Einhorn/Michael reaction 90 parts of the polybutadienemaleimide prepared as described under (b), 300 parts of a phenol-containing indene resin containing 6.1% of phenolic OH groups (from Rütgers AG), and 118.3 parts of acrylamide, 17.8 parts of phenol, 69 parts of paraformaldehyde, 0.2 part of phenothiazine and 75 parts of toluene are brought into solution at 115° C. The solution is then cooled to 60° C. and 1 part of boron trifluoride ethyl etherate is added. After reaction for 30 minutes at 60° C., a further 1 part of boron trifluoride ethyl etherate is added, followed by another 0.5 part after another 30 minutes. The mixture is allowed to continue reacting for 3 hours at 60° C., and water is then eliminated at 120° C. Thereafter, 160 parts of diethanolamine are added dropwise at 90° C., and the mixture is allowed to continue reacting for a further 2 hours at 90° C. Finally, it is diluted with 126.5 parts of isopropanol and 126.5 parts of ethylglycol. The solids content is 69%.

(f) Tscherniac-Einhorn/Michael reaction 578.4 parts of the polybutadienemaleimide prepared as described under (c), 170 parts of acrylamide, 99.7 parts of paraformaldehyde, 140 parts of p-tert.-butylphenol, 100 parts of bisphenol A, 0.5 part of phenothiazine and 6.6 parts of toluene are brought into solution at 115° C. The solution is cooled to 60° C. and 1.5 parts of boron trifluoride ethyl etherate are added. After reaction for 30 minutes at 60° C., a further 1.5 parts of boron trifluoride ethyl etherate are added, followed by a further 1 part after another 30 minutes. The mixture is allowed to continue reacting for a further 3 hours at 60° C., and water is then eliminated at 120° C. Thereafter, 252.1 parts of diethanolamine are added dropwise at 90° C., and the mixture is allowed to continue reacting for a further 2 hours at 90° C. The solids content is 86.3.

(g) Tscherniac-Einhorn/Michael reaction 357.3 parts of a phenol-containing indene resin containing 6.1% of phenolic OH groups, and 91 parts of acrylamide, 53.1 parts of paraformaldehyde, 0.2 part of phenothiazine and 62 parts of toluene are brought into solution at 115° C. The solution is then cooled to 60° C. and 0.7 part of boron trifluoride ethyl etherate is added. After reaction for 30 minutes at 60° C., a further 0.7 part of boron trifluoride ethyl etherate is added, followed by another 0.4 part after another 30 minutes. The mixture is stirred for 3 hours at 60° C., and water is then eliminated at 120° C. Thereafter, 134.6 parts of diethanolamine are added dropwise at 90° C., and the mixture is allowed to continue reacting for a further two hours at 90° C. Finally, it is diluted with 50 parts of isopropanol and 50 parts of isobutanol. The solids content is 78.2%.

(h) Preparation of a Tscherniac-Einhorn product containing acrylic double bonds.

752 parts of phenol, 456 parts of bisphenol A, 1,278 parts of acrylamide, 623.7 parts of paraformaldehyde and 0.2 part of Cu powder are brought into solution at 120° C., the solution is cooled to 60° C. and 24 parts of boron trifluoride ethyl etherate are added. The mixture is then reacted for 4 hours at 60° C. (including the exothermic reaction phase) and for 30 minutes at 100° C. The water of reaction is then substantially distilled off under reduced pressure, and the mixture is diluted to a solids content of 70% with 1,194 parts of isobutanol. Preparation of the electrocoating binder

EXAMPLE A 252 parts of the Tscherniac-Einhorn/Michael adduct prepared according to (d), 33.5 parts of paraformaldehyde, 125 parts of bisphenol A, 86.4 parts of di-n-butylamine, 50 parts of di-n-hexylamine and 29 parts of isobutanol are stirred for 15 minutes at 50° C. and then for 2.5 hours at 80° C. 137.7 parts of a diglycidyl ether obtained from bisphenol A and epichlorohydrin, and having an epoxide value of 0.2, 54.7 parts of a triglycidyl ether obtained from pentaerythritol and epichlorohydrin, and having an epoxide value of 0.62, and 50 parts of isobutanol are then added. The mixture is allowed to continue reacting at 70° C. until the viscosity reaches 740 mPa.s (measured by means of an ICI plate-and-cone viscometer from Epprecht, at 75° C.), and is then diluted with 50 parts of isobutanol. The solids content is 74.2%.

EXAMPLE B 328.4 parts of the Tscherniac-Einhorn/Michael adduct prepared according to (d), 33.5 parts of paraformaldehyde, 121.2 parts of di-n-butylamine, 125 parts of bisphenol A, and 40 parts of isobutanol are stirred for 15 minutes at 50° C. and then for 2.5 hours at 80° C. 200 parts of a diglycidyl ether obtained from bisphenol A and epichlorohydrin, and having an epoxide value of 0.2, 54.7 parts of a triglycidyl ether obtained from pentaerythritol and epichlorohydrin, and having an epoxide value of 0.62, and 35 parts of isobutanol are then added. The mixture is allowed to continue reacting at 70° C. until the viscosity reaches 840 mPa.s (measured by means of an ICI plate-and-cone viscometer, at 75° C.). The reaction is then terminated with 7 parts of mercaptoethanol in 50 parts of isobutanol. The solids content is 72.1%.

EXAMPLE C 291.3 parts of the Tscherniac-Einhorn/Michael adduct prepared according to (e), 33.5 parts of paraformaldehyde, 125 parts of bisphenol A, 86.4 parts of di-n-butylamine, 50 parts of di-n-hexylamine and 32 parts of isobutanol are stirred for 15 minutes at 50° C. and then for 2.5 hours at 80° C. 137.3 parts of a diglycidyl ether obtained from bisphenol A and epichlorohydrin, and having an epoxide value of 0.2, 57 parts of a triglycidyl ether obtained from petaerythritol and epichlorohydrin, and having an epoxide value of 0.62, and 50 parts of isobutanol are then added. The mixture is allowed to continue reacting at 70° C. until the viscosity reaches 490 mPa.s (measured by means of an ICI plate-and-cone viscometer, at 75° C.), and is then diluted with 50 parts of isobutanol. The solids content is 76.4%.

EXAMPLE D 303.4 parts of the Tscherniac-Einhorn/Michael adduct prepared according to (e), 82.5 parts of bisphenol A, 26.7 parts of paraformaldehyde, 95.6 parts of di-n-butylamine, 34 parts of isopropanol and 35 parts of isodecanol are stirred for 15 minutes at 50° C. and then for 2.5 hours at 80° C. 142 parts of a diglycidyl ether obtained from bisphenol A and epichlorohydrin, and having an epoxide value of 0.1, and 47 parts of toluene are then added. After a further 30 minutes at 75°-80° C., 103 parts of a diglycidyl ether obtained from bisphenol A and epichlorohydrin, and having an epoxide value of 0.2, 56 parts of a triglycidyl ether obtained from pentaerythritol and epichlorohydrin, and having an epoxide value of 0.62, and 50 parts of ethyl glycol are added. The mixture is allowed to continue reacting at 70°-75° C. until the viscosity reaches 460 mPa.s (measured by means of an ICI plate-and-cone viscometer, at 75° C.). Finally, the reaction is terminated by addition of 7 parts of mercaptoethanol. The solids content is 69.2%.

EXAMPLE E 351 parts of the Tscherniac-Einhorn/Michael adduct prepared according to (e), 80 parts of bisphenol A, 89.7 parts of di-n-butylamine, 25 parts of paraformaldehyde, 25 parts of isodecanol and 33 parts of isopropanol are stirred for 15 minutes at 50° C. and then for 2.5 hours at 80° C. 131 parts of a diglycidyl ether obtained from bisphenol A and epichlorohydrin, and having an epoxide value of 0.1 and 70 parts of toluene are then added. After a further 30 minutes at 75°-80° C., 95 parts of a diglycidyl ether obtained from bisphenol A and epichlorohydrin, and having an epoxide value of 0.2, 55.2 parts of a triglycidyl ether obtained from pentaerythritol and epichlorohydrin, and having an epoxide value of 0.62, and 42 parts of isobutanol are added. The mixture is allowed to continue reacting at 75° C. until the viscosity reaches 425 mPa.s (measured by means of an ICI plate-and-cone viscometer, at 75° C.). Finally, the reaction is terminated by addition of 7 parts of mercaptoethanol. The solids content is 69.2%.

EXAMPLE F 210 parts of the Tscherniac-Einhorn/Michael adduct prepared according to (f), 118 parts of bisphenol A, 40.7 parts of paraformaldehyde, 146.1 parts of di-n-butylamine, 110 parts of isopropanol and 110 parts of ethylglycol are stirred for 15 minutes at 50° C. and then for 2.5 hours at 80° C. 206.8 parts of the binder obtained according to (b), 285 parts of a diglycidyl ether obtained from bisphenol A and epichlorohydrin, and having an epoxide value of 0.2, 80 parts of a triglycidyl ether obtained from pentaerythritol and epichlorohydrin, and having an epoxide value of 0.62, 37 parts of isopropanol and 4 parts of isobutanol are then added. The mixture is allowed to continue reacting at 70° C. until the viscosity reaches 510 mPa.s (measured by means of an ICI plate-and-cone viscometer from Epprecht, at 75° C.). The reaction is terminated by addition of 9.7 parts of acetic acid. The solids content is 70%.

EXAMPLE G 214.8 parts of the Tscherniac-Einhorn/Michael adduct prepared according to (g), 82.5 parts of bisphenol A, 26.7 parts of paraformaldehyde, 95.6 parts of di-n-butylamine, 70 parts of isopropanol and 30 parts of isodecanol are stirred for 15 minutes at 50° C. and then for 2.5 hours at 80° C. 142 parts of a diglycidyl ether obtained from bisphenol A and epichlorohydrin, and having an epoxide value of 0.1, and 47 parts of toluene are then added. After a further 30 minutes at 75°-80° C., 103 parts of a diglycidyl ether obtained from bisphenol A and epichlorohydrin, and having an epoxide value of 0.2, 52.5 parts of a triglycidyl ether obtained from pentaerythritol and epichlorohydrin, and having an epoxide value of 0.62, and 47 parts of ethylglycol are added. The mixture is allowed to continue reacting at 70° C. until the viscosity reaches 400 mPa.s (measured by means of an ICI plate-and-cone viscometer, at 75° C.). The solids content is 73.3%. Electrocoating

EXAMPLE 1

To prepare a 10% strength coating bath, 100 parts of the solid resin obtained according to Example A and 80 ppm of copper (based on bath volume) as an aqueous copper acetate solution are mixed thoroughly, protonation is effected with 1.8% of acetic acid (based on solid resin) and the mixture is made up to 1,000 parts with fully demineralized water. The coating bath is then stirred for 48 hours at 30° C., and has a pH of 6.35 and a conductivity of 1,014 $\mu$S/cm$^{-1}$. On phosphatized steel sheets, deposition for 2 minutes at 230 volt and 30° C., and hardening for 20 minutes at 180° C., give a smooth 15-17 $\mu$m thick coating.

The DIN 50,021 corrosion test, carried out for 10 days, gave a penetration of from 1.6 to 3.6 mm on zinc-phosphatized water-rinsed steel sheets (eg. Bonder® 125 W from Metallgesellschaft AG), and a penetration of from 0.7 to 1.4 mm on iron-phosphatized water-rinsed steel sheets (eg. Bonder® 1,041 W).

EXAMPLE 2

To prepare a 10% strength coating bath, 100 parts of the solid resin obtained according to Example B and 80 ppm of copper (based on bath volume) as an aqueous copper acetate solution are mixed thoroughly, protonation is effected with 2% of acetic acid (based on solid resin), and the mixture is made up to 1,000 parts with fully demineralized water. The coating bath is then stirred for 48 hours at 30° C., and has a pH of 6.6 and a conductivity of 1,074 $\mu$S.cm$^{-1}$. After stirring, 1.5 parts of isodecanol are added. On phosphatized steel sheets, deposition for 2 minutes at 200 volt and 30° C., and hardening for 20 minutes at 180° C., give a smooth 14-16 $\mu$m thick coating. On non-pretreated steel sheets, deposition for 2 minutes at 120 volt and 30° C. and hardening for 20 minutes at 180° C., give a smooth 14-15 $\mu$m thick coating.

The DIN 50,021 corrosion test, carried out for 10 days, gave a penetration of from 1.2 to 1.8 mm on zinc-phosphatized water-rinsed steel sheets, a penetration of from 0.4 to 1 mm on iron-phosphatized water-rinsed steel sheets, and a penetration of from 4 to 6.5 mm on non-pretreated steel sheets, the penetrations being measured from the cut.

EXAMPLE 3

To prepare a 10% strength coating bath, 100 parts of the solid resin obtained according to Example C and 120 ppm of copper (based on bath volume) as an aqueous copper acetate solution are mixed thoroughly, protonation is effected with 1.7% of acetic acid (based on solid resin) and the mixture is made up to 1,000 parts with fully demineralized water. The coating bath is then stirred for 48 hours at 30° C., and has a pH of 6.7 and a conductivity of 1,054 $\mu$S.cm$^{-1}$. On phosphatized steel sheets, deposition for 2 minutes at 220 volt and 30° C., and hardening for 20 minutes at 180° C., give a smooth 15-16 $\mu$m thick coating.

The DIN 50,021 corrosion test, carried out for 10 days, gave a penetration of from 1.7 to 2.5 mm on zinc phosphatized water-rinsed steel sheets, and a penetration of from 1.6 to 4.7 mm on iron-phosphatized water-rinsed steel sheets, the penetrations being measured from the cut.

EXAMPLE 4

To prepare a 10% strength coating bath, 100 parts of the solid resin obtained according to Example D and 120 ppm of copper (based on bath volume) as an aqueous copper acetate solution are mixed thoroughly, protonation is effected with 2.2% of acetic acid (based on solid resin) and the mixture is made up to 1,000 parts with fully demineralized water. The coating bath is then stirred for 48 hours at 30° C., and has a pH of 6.1 and a conductivity of 1,350 $\mu$S.cm$^{-1}$. After stirring, 5 parts of isodecanol are added. On phosphatized steel sheets, deposition for 2 minutes at 130 volt and 30° C., and hardening for 20 minutes at 180° C., give a smooth 14–16 μm thick coating.

The DIN 50,021 corrosion test, carried out for 10 days, gave a penetration of from 1.1 to 1.7 mm on zinc-phosphatized water-rinsed steel sheets, and a penetration of from 0.5 to 1.4 mm on iron-phosphatized water-rinsed steel sheets, the penetrations being measured from the cut.

EXAMPLE 5

To prepare a 10% strength coating bath, 100 parts of the solid resin obtained according to Example E and 120 ppm of copper (based on bath volume) as an aqueous copper acetate solution are mixed thoroughly, protonation is effected with 1.8% of acetic acid (based on solid resin) and the mixture is made up to 1,000 parts with fully demineralized water. The coating bath is then stirred for 48 hours at 30° C., and has a pH of 6.5 and a conductivity of 1,079 μS.cm$^{-1}$. On phosphatized steel sheets, deposition for 2 minutes at 200 volt and 30° C. and hardening for 20 minutes at 180° C. gives a smooth 14–16 μm thick coating. On non-pretreated steel sheets, deposition for 2 minutes at 50 volt and 30° C., and hardening for 20 minutes at 180° C., give a coating of the same thickness.

The DIN 50,021 corrosion test, carried out for 10 days, gave a penetration of from 1 to 2.5 mm on zinc-phosphatized water-rinsed steel sheets, a penetration of from 1.2 to 3 mm on iron-phosphatized water-rinsed steel sheets and a penetration of from 4.8 to 7 mm on non-pretreated steel sheets, the penetrations being measured from the cut.

EXAMPLE 6

To prepare a 10% strength coating bath, 100 parts of the solid resin obtained according to Example F and 120 ppm of copper (based on bath volume) as an aqueous copper acetate solution are mixed thoroughly, protonation is effected with 1.3% of acetic acid (based on solid resin) and the mixture is made up to 1,000 parts with fully demineralized water. The coating bath is stirred for 48 hours at 30° C., and has a pH of 5.95 and a conductivity of 1,200 μS.cm$^{-1}$. After the stirring, 5 parts of isodecanol are added. On phosphatized steel sheets, deposition for 2 minutes at 150 volt and 30° C., and hardening for 20 minutes at 180° C., give a smooth 15–16 μm thick coating. On non-pretreated steel sheets, deposition for 2 minutes at 100 volt and 30° C., and hardening for 20 minutes at 180° C., give a smooth 14.5–15.5 μm thick coating.

The DIN 50,021 corrosion test, carried out for 10 days, gave a penetration of 1.5–2.8 mm on zinc-phosphatized water-rinsed steel sheets, a penetration of 0.3–1.9 mm on iron-phosphatized water-rinsed steel sheets, and a penetration of 8–10 mm on non-pretreated steel sheets, the penetrations being measured from the cut.

EXAMPLE 7

To prepare a 10% strength coating bath, 100 parts of the solid resin obtained according to Example G and 80 ppm of copper (based on bath volume) as an aqueous copper acetate solution are mixed thoroughly, protonation is effected with 1.8 parts of acetic acid (based on solid resin) and the mixture is made up to 1,000 parts with fully demineralized water. The coating bath is stirred for 48 hours at 30° C., and has a pH of 6.05 and a conductivity of 1,050 μS.cm$^{-1}$. After the stirring, 7.5 parts of isodecanol are added. On phosphatized steel sheets, deposition for 2 minutes at 230 volt and 30° C., and hardening for 20 minutes at 180° C., give a smooth 9–12 μm thick coating.

The DIN 50,021 corrosion test, carried out for 10 days, gave a penetration of 0.5–2 mm on zinc-phosphatized water-rinsed steel sheets and a penetration of 0.2–1.2 mm on iron-phosphatized water-rinsed steel sheets, the penetrations being measured from the cut.

We claim:

1. A polyadduct/polycondensate which can be diluted with water when protonated with an acid, contains basic nitrogen groups, and has been obtained by the polyaddition reaction of
   (A) from 5 to 90% by weight of a Mannich base obtained from
      (a) a monophenol or polyphenol or a mixture of a monophenol and a polyphenol,
      (b) one or more dialkylamines of the formula

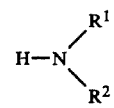

where $R^1$ and $R^2$ are identical or different and are each alkyl or alkoxyalkyl of 1 to 9 carbon atoms, or are linked to one another to form a 5-membered or 6-membered ring, and
      (c) formaldehyde or a formaldehyde donor, with
   (B) from 10 to 95% by weight of one or more epoxy resins, wherein the polyadduct/polycondensate of (A) with (B) contains groups, which are bonded to aromatic rings, of the formula (I)

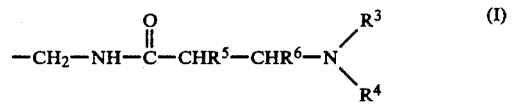

and may or may not contain groups of the formula (II)

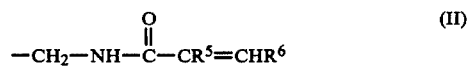

where $R^3$ and $R^4$ are identical or different and are each alkyl of 1 to 9 carbon atoms, or hydroxyalkyl or alkoxyalkyl, each of 2 to 10 carbon atoms, or are linked to one another to form a 5-membered or 6-membered ring, and $R^5$ and $R^6$ are identical or different and are each hydrogen or methyl.

2. A polyadduct/polycondensate as claimed in claim 1, wherein the component (b) used to prepare the Mannich base (A) is either di-n-butylamine or a mixture of di-n-butylamine and another secondary amine (b).

3. A polyadduct/polycondensate as claimed in claim 1 or 2, wherein the monophenols or polyphenols, or mixture of monophenols and polyphenols, (a) used to prepare the Mannich base (A) are
   (a$_1$) one or more mononuclear or polynuclear monophenols or polyphenols, or a mixture of such monophenols and polyphenols, some or all of which are replaced by (a₂) a mononuclear or polynuclear monophenol or polyphenol, or a mixture of a monophenol and a polyphenol of this type, which contains groups of the formula (I)

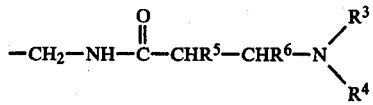

and may or may not contain groups of the formula (II)

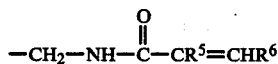

where $R^3$, $R^4$, $R^5$ and $R^6$ have the above meanings.

4. A polyadduct/polycondensate as claimed in claim 1 or 2 or 3, wherein a reaction product of a polyepoxide compound with less than the equivalent amount of a mononuclear or polynuclear monophenol and/or polyphenol (a₂) is used as component (B).

5. A polyadduct/polycondensate as claimed in claim 3, wherein $R^3$ and $R^4$ in the formula (I) are hydroxyethyl.

6. A process for the cathodic electrocoating of metallic articles, wherein the binder used is the polyadduct/polycondensate as claimed in claim 1 or 2.

7. A process for the cathodic electrocoating of metallic articles, wherein the binder used is the polyadduct/polycondensate as claimed in claim 3.

8. A process for the cathodic electrocoating of metallic articles, wherein the binder used is the polyadduct/polycondensate as claimed in claim 4.

9. A process for the cathodic electrocoating of metallic articles, wherein the binder used is the polyadduct/polycondensate as claimed in claim 5.